US007733111B1

(12) United States Patent
Zhao et al.

(10) Patent No.: US 7,733,111 B1
(45) Date of Patent: Jun. 8, 2010

(54) SEGMENTED OPTICAL AND ELECTRICAL TESTING FOR PHOTOVOLTAIC DEVICES

(75) Inventors: Guoheng Zhao, Milpitas, CA (US); Bin-Ming B. Tsai, Saratoga, CA (US); Mehdi Vaez-Iravani, Los Gatos, CA (US); Ady Levy, Sunnyvale, CA (US); George H. Zapalac, Jr., Santa Cruz, CA (US); Samuel S. H. Ngai, San Francisco, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 213 days.

(21) Appl. No.: 12/045,734

(22) Filed: Mar. 11, 2008

(51) Int. Cl.
*G01R 31/26* (2006.01)

(52) U.S. Cl. .................. 324/765; 324/750; 324/751; 324/752

(58) Field of Classification Search .............. None
See application file for complete search history.

(56) References Cited

U.S. PATENT DOCUMENTS

| | | | |
|---|---|---|---|
| 4,166,918 A | 9/1979 | Nostrand et al. | |
| 4,451,970 A | 6/1984 | Izu et al. | |
| 4,464,823 A | 8/1984 | Izu et al. | |
| 4,706,019 A * | 11/1987 | Richardson | 324/751 |
| 4,749,454 A | 6/1988 | Arya et al. | |
| 5,277,786 A | 1/1994 | Kawakami | |
| 5,281,541 A | 1/1994 | Saito et al. | |
| 5,320,723 A | 6/1994 | Kawakami | |
| 6,225,640 B1 | 5/2001 | Glenn et al. | |
| 6,423,595 B1 | 7/2002 | Beernink | |
| 6,573,699 B1 * | 6/2003 | Hama et al. | 324/96 |
| 6,972,582 B2 * | 12/2005 | Howland et al. | 324/761 |
| 2004/0032581 A1 * | 2/2004 | Nikoonahad et al. | 356/237.2 |
| 2005/0140379 A1 * | 6/2005 | Furukawa et al. | 324/751 |
| 2005/0141810 A1 * | 6/2005 | Vaez-Iravani et al. | 385/33 |

* cited by examiner

*Primary Examiner*—Minh N Tang
(74) *Attorney, Agent, or Firm*—Luedeka, Neely & Graham, P.C.

(57) ABSTRACT

An apparatus for inducing a current in a solar cell substrate. A substrate receiving surface receives the substrate, and an array of a plurality of individually addressable light sources illuminates the substrate in a sequenced manner. A sequencer controls the sequenced manner of illumination of the substrate by the array. A front side electrical contact makes electrical contact to a front side of the substrate, and a back side electrical contact makes electrical contact to a back side of the substrate. A meter is electrically connected to the front side electrical contact and the back side electrical contact, and senses the current induced in the substrate during the sequenced illumination of the substrate.

16 Claims, 19 Drawing Sheets

SEGMENTED OPTICAL AND ELECTRICAL TESTING FOR PHOTOVOLTAIC DEVICES

FIELD

This invention relates to the field of photovoltaic cells. More particularly, this invention relates to testing for the defects that tend to reduce the efficiency of photovoltaic cells.

BACKGROUND

Improving photovoltaic conversion efficiency and reducing manufacturing costs have been the main drivers of the solar energy industry. A majority of commercial solar cells are made from multicrystalline or single crystal silicon wafers. Other types of solar cells based on thin film technologies such as $Cu(In,Ga)Se_2$, CdTe, and amorphous silicon have shown great growth potential due to their lower manufacturing cost. Regardless of the technology used, there is generally a gap between the efficiency of devices produced in the lab and devices produced by mass production, mainly because of various imperfections introduced during the fabrication process. Inspecting the solar cells for defects during the fabrication processes, and finding the root causes of defects can improve the production yield and reduce manufacturing costs.

Laser beam induced current has been used to investigate solar cell defects. The method can detect various types of defects that affect the solar efficiency of a solar cell. A schematic of a laser beam induced current system 10 is shown in FIG. 1. A laser beam 12 from a laser source 14 is focused to a small spot onto the surface of a substrate 16, and a scanning device, typically an XY scanning stage or chuck 18 for moving the substrate 16 and an XY scanning mirror 20, scan the laser spot across the surface of the substrate 16 in a raster scanning scheme. The current is measured by an external circuit 22, such as a current amplifier connected to the solar cell 16. The spot scanning image is a spatial map of the efficiency of the solar cell 16 in converting light into electrical current. Dark spots in the spatial map indicate that a lower current was collected by the external measurement circuit 22, which can be caused by various types of defects in the solar cell 16. These defect types typically include light blockage at the surface of the solar cell 16, low absorption of light, low quantum efficiency, and current leakage defects (shunts).

Solar cells 16 have large capacitances that slow their response time when electric measurements are taken. In a production environment where the speed of inspection and testing are more important than the raw optical resolution, these slow-downs tend to be rather expensive. The speed of high resolution spot scanning laser beam induced current measurement is limited by the solar response time, and therefore is not generally suitable for inspecting very large substrates at a high resolution. It is also not generally suitable for integration with solar current-voltage testing, which can have an advantage in overall inspection and testing throughput and cost of ownership. Other disadvantages of spot scanning laser beam induced current include the higher cost associated with lasers, spot scanning hardware, and the complexity of the mechanical moving device.

What is needed, therefore, is a system that overcomes problems such as those described above, at least in part.

SUMMARY

The above and other needs are met by an apparatus for inducing a current in a solar cell substrate. A substrate receiving surface receives the substrate, and an array of a plurality of individually addressable light sources illuminates the substrate in a sequenced manner. A sequencer controls the sequenced manner of illumination of the substrate by the array. A front side electrical contact makes electrical contact to a front side of the substrate, and a back side electrical contact makes electrical contact to a back side of the substrate. A meter is electrically connected to the front side electrical contact and the back side electrical contact, and senses the current induced in the substrate during the sequenced illumination of the substrate.

In this manner, an apparatus according to the present invention can induce a current in a solar cell substrate very quickly and relatively inexpensively, because no laser and scanning hardware are required. The sequenced operation of the illuminating array provides the targeted illumination of the substrate for detection of defects, based on the current that is measured as a given portion of the substrate is illuminated. The illumination array can be constructed with no moving parts, and thus can be extremely durable and reliable with little or no maintenance required.

In various embodiments according to this aspect of the invention, the array is a two dimensional array of individually addressable light sources. In other embodiments the array is a linear array of individually addressable light sources. In some embodiments the array includes two linear arrays of individually addressable light sources, where the pixels of each array are offset one from another. In some embodiments the individually addressable light sources are monochromatic light emitting diodes, and in other embodiments the individually addressable light sources are multi-chromatic light emitting diodes. The array of individually addressable light sources in some embodiments is a diffuse light source adjacent a liquid crystal display, where individual pixels of the liquid crystal display are individually addressable and operable to permit or prevent transmission of light from the diffuse light source in the sequenced manner.

Some embodiments include a lens for focusing the sequenced illumination on the substrate, or an array of lenses, where one each of the lenses in the array of lenses is associated with one of each of the pixels in the array of individually addressable light sources. In some embodiments a gradient index lens array is disposed between the array of individually addressable light sources and the substrate receiving surface.

In one embodiment a detector receives reflected light from the substrate and determines an intensity of the reflected light. Some embodiments include a voltage sensing meter and a current providing instrument that are electrically connected to the substrate, and means for constructing a current-voltage profile of the substrate during the sequenced illumination of the substrate. The front side electrical contacts of some embodiments include electrical probes that are disposed on the array of individually addressable light sources, where the electrical probes make electrical contact to the front side of the substrate as the array is brought toward the substrate receiving surface. In some embodiments the array of individually addressable light sources is disposed in a gantry that is movable along a length of the substrate receiving surface. The substrate receiving surface in some embodiments is disposed on a chuck that is movable underneath the array of individually addressable light sources.

According to another aspect of the invention there is described a method for inducing a current in a solar cell substrate. The substrate is placed on a substrate receiving surface and illuminated in a sequenced manner with an array of a plurality of individually addressable light sources. Electrical contact is made to both the front side of the substrate and the back side of the substrate, and a current induced in the substrate during the sequenced illumination of the substrate is sensed with a meter that is electrically connected to the front side electrical contact and the back side electrical contact.

In various embodiments according to this aspect of the invention, a substrate voltage is sensed with a voltage sensing meter that is electrically connected to the substrate, a current is provided to the substrate with a current providing instrument that is electrically connected to the substrate, and a current-voltage profile of the substrate during the sequenced illumination of the substrate is constructed.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

According to the various embodiments of the present invention, an array of light sources other than a laser beam is used to induce a current in the substrate 16. The light source is directed to specific known locations on the substrate 16, eventually covering all or all of a desired portion of the substrate 16, so that a diagram of the current profile at different positions on the substrate 16 can be created, which diagram is generally referred to as a light induced current image. In this manner, a light induced current image of the substrate 16 can be generated very quickly, with no moving parts (in some embodiments), and very inexpensively (compared to a laser induced current image). This method is also very easily combined with current-voltage testing. Further, the method can be applied to very large substrates 16.

Figure 1:
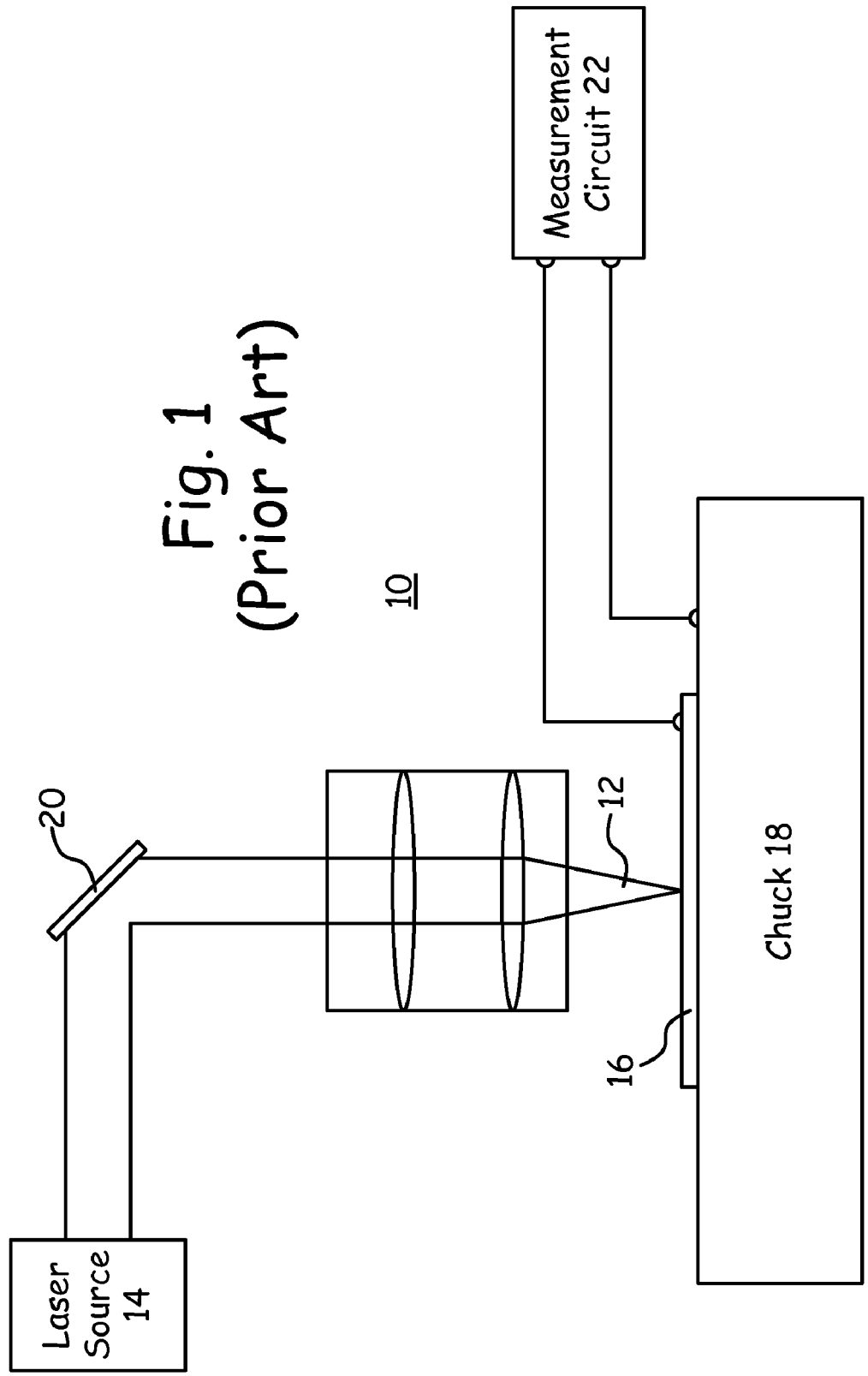
FIG. 1 is prior art functional block diagram of a prior art laser beam induced current system.
Figure 2:
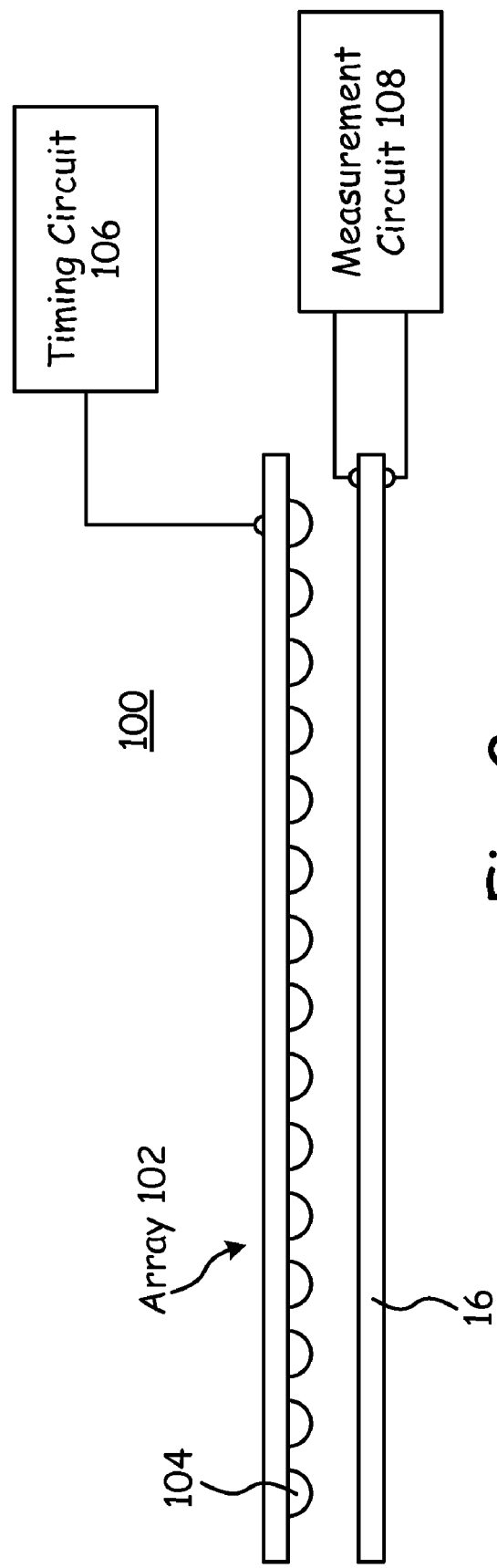
FIG. 2 is a functional block diagram of a light induced current system according to an embodiment of the present invention.
Figure 3:
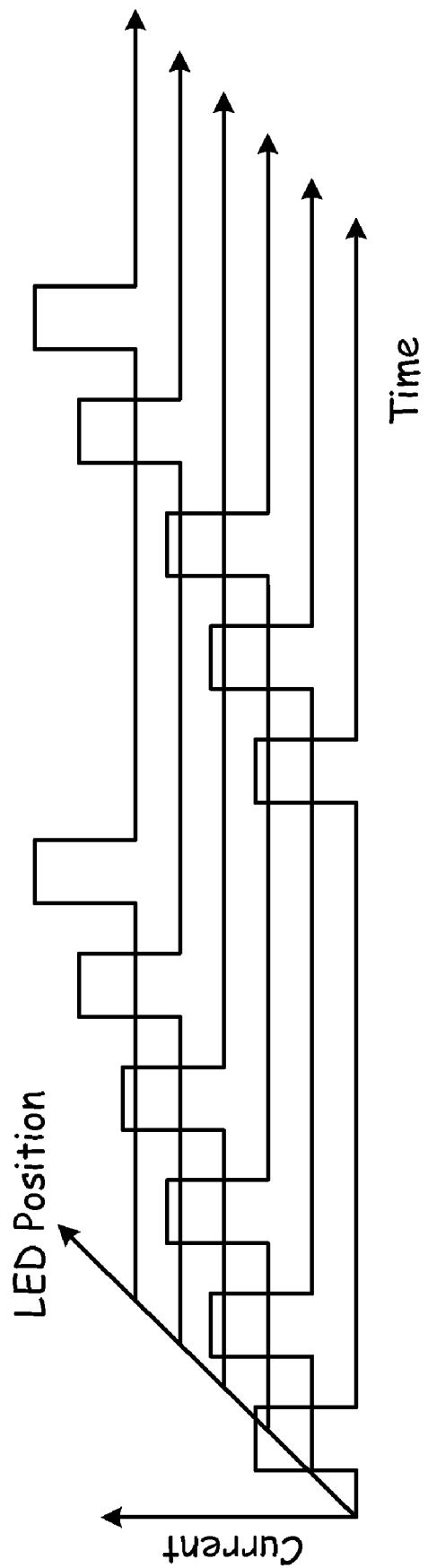
FIG. 3 is a timing diagram for energizing the individually addressable pixels of an illumination source for a light induced current system according to an embodiment of the present invention.
Figure 4:
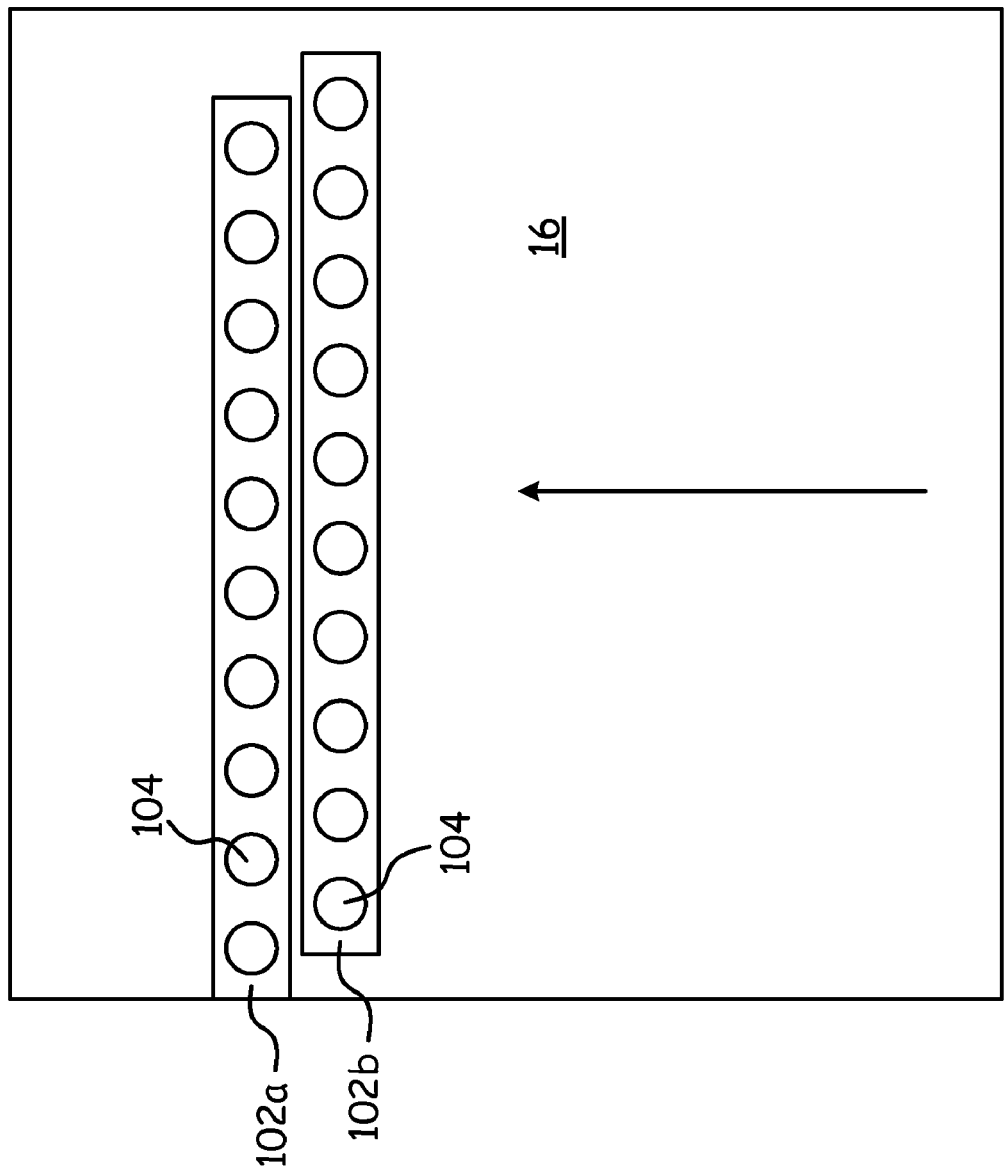
FIG. 4 is a functional block diagram of a light induced current system having two offset one-dimensional light source arrays according to another embodiment of the present invention.

FIG. 2 shows the general construction of one embodiment of a system 100 according to the present invention. An array 102 of light emitting diodes 104 illuminates the substrate 16 at a relatively close distance. Each light emitting diode 104 in the array 102 is switched on and off in a sequence that is controlled by a timing circuit 106. The solar cell 16 is connected to an external measurement circuit 108, such as a current amplifier, to measure the short circuit current generated by the sequenced illumination. When the light emitting diodes 104 in the array 102 are sequenced as indicated in FIG. 3, the current measurement is synchronized with the sequence of illumination, and generates a spatial map of current generated by the localized illumination. Dark areas in the image indicate a low generation of current in the portion of the solar cell 16 that was illuminated at that point in time. A two-dimensional image can be generated by moving the substrate 16 or the array 102 along the direction that is perpendicular to a line of light emitting diodes 104 in one or more arrays 102a and 102b, as shown in FIG. 4.

The light emitting diodes 104 in the array 102 may all be of the same wavelength, or of different wavelengths. Longer wavelength light penetrates deeper into the substrate 16 than shorter wavelengths do. Within its spectral response, a solar cell 16 tends to have a lower efficiency at shorter wavelengths. Light beam induced current images at different illumination wavelengths can be used to further classify defects—for example, optical defects versus electrical defects. Light beam induced current images at different wavelengths may be processed to derived spatial variations of junction depth, carrier diffusion length, and surface recombination.

Figure 5:
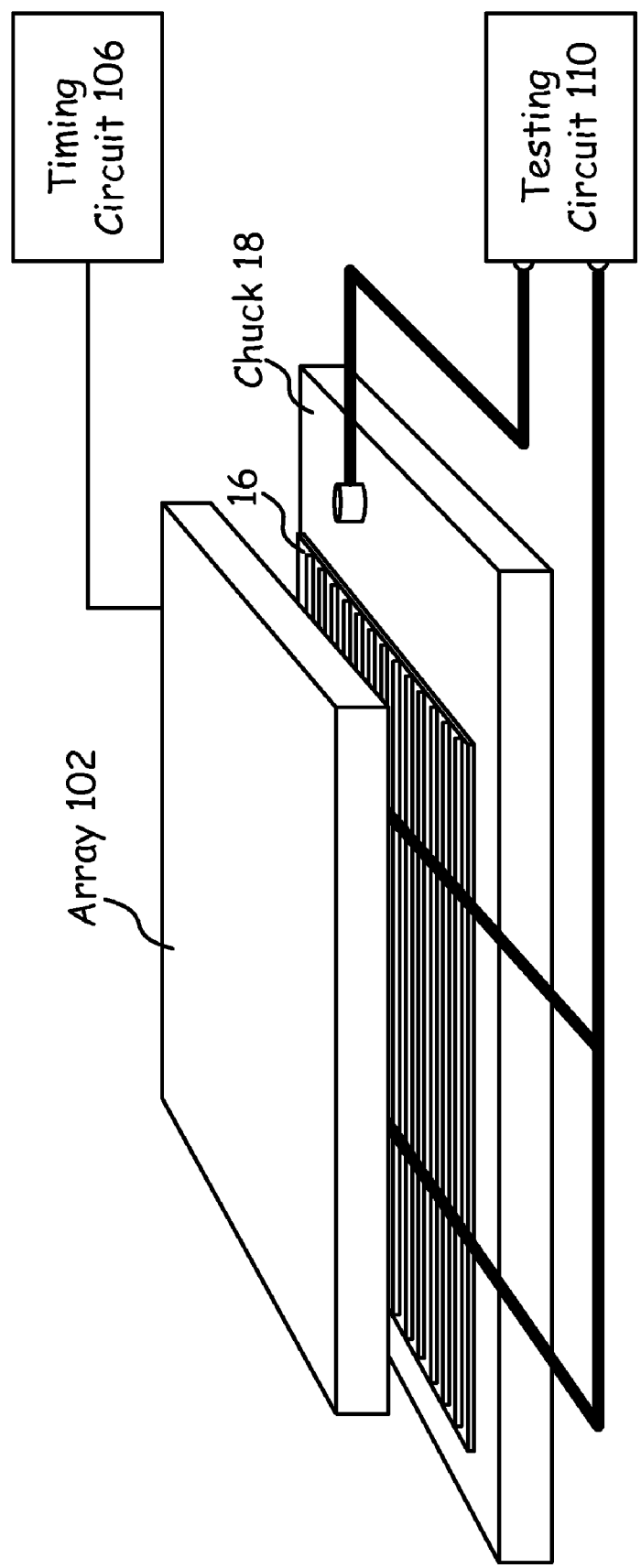
FIG. 5 is a functional block diagram of a light induced current system having a two-dimensional light source array according to an embodiment of the present invention.

A two-dimensional, addressable array 102 can be used to generate light induced current images with stationary illumination instead of with a laser beam, as shown in FIG. 5. The on/off sequencing of the light emitting diodes 104 can be controlled to achieve a raster scan of the full substrate 16. A two dimensional array 102 is compatible with illuminated current-voltage testing and solar efficiency measurements, which are typically performed with a dedicated solar cell sorter/tester. When all of the light emitting diodes 104 are on, the array 102 produces a uniform illumination of the full surface of the substrate 16.

Figure 6:
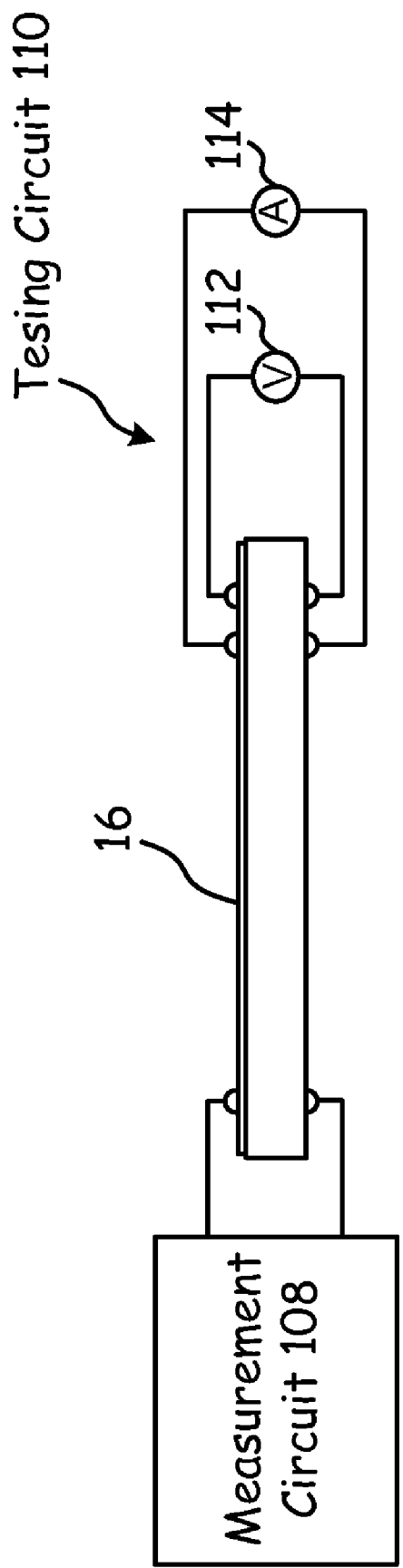
FIG. 6 is a functional block diagram of a light induced current system according to an embodiment of the present invention, depicting the light induced current measurement module and the current-voltage measurement modules.

As depicted in FIG. 6, a separate current-voltage testing circuit 110 is connected to the solar cell 16, and a number of parameters such as short circuit current, open circuit voltage, shunt resistance, serial resistance, and solar cell 16 efficiency can be measured using separate voltage measurement circuit 112 and current providing circuit 114.

For current-voltage testing, the output intensity of each light emitting diode 104 in the array 102 needs to reach the standard testing condition of one Sun of illumination, which is one milliwatt per square millimeter, with about half of the light being outside of the solar response spectrum. High intensity light emitting diodes 104 that are currently commercially available can output more than about one hundred times this amount of light. Therefore taking into account the light lost due to numerical aperture coupling, a closely packed array 102 of light emitting diodes 104 can generate one Sun of illumination intensity. The range of the solar spectrum that is within the spectral response of solar cells 16 can be simulated with multiple wavelengths of light emitting diodes 104, where either a given light emitting diode 104 emits multiple wavelengths, or a series of light emitting diodes 104 is used, where each of the light emitting diodes 104 in the series emits a different wavelength of light.

Figure 7:
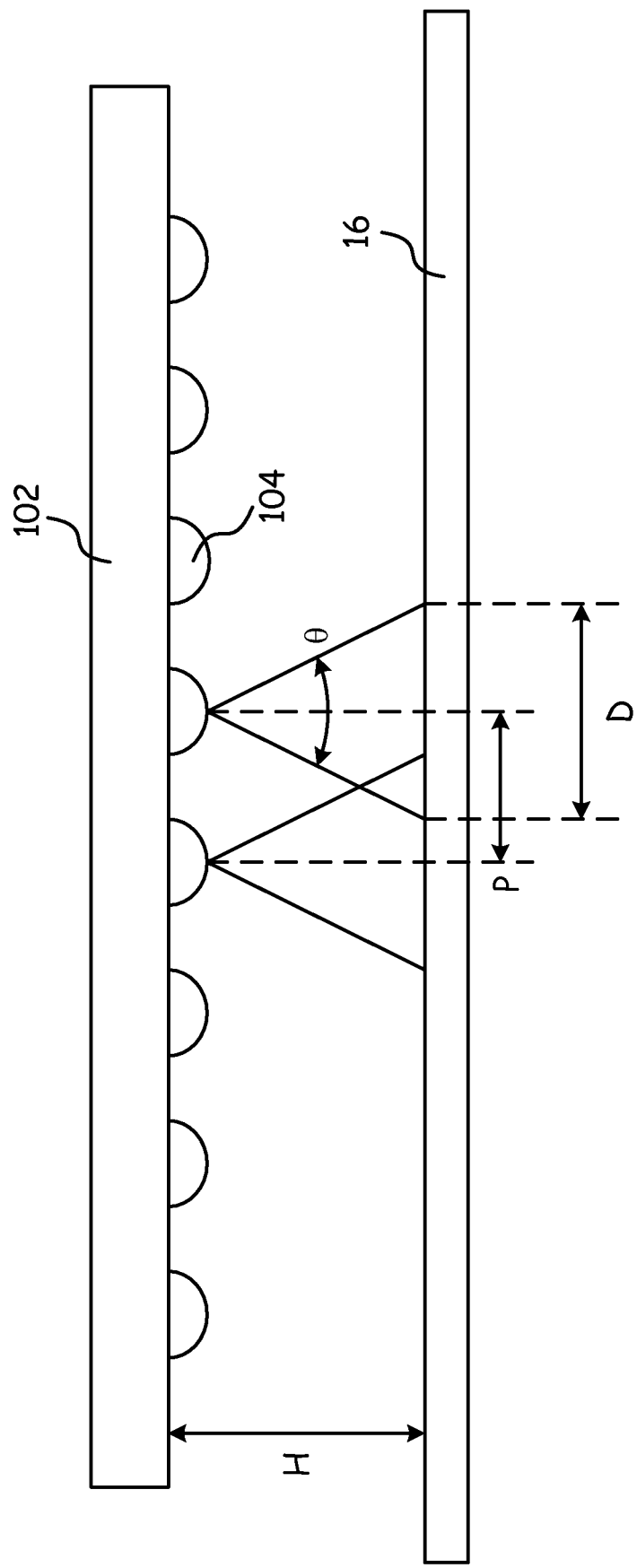
FIG. 7 is a representational diagram of light element spacing according to an embodiment of the present invention.

For proximity illumination, the optical resolution is determined from the divergent angle theta of each diode 104 and the distance H between the array 102 and the substrate 16 according to the equation:

$$D = 2H \times \text{Tan}\left(\frac{\theta}{2}\right)$$

as depicted in FIG. 7. The pixel size is given by the spacing P between the diodes 104 (for uniform spacing). The pixel size and optical resolution can be optimized for a good balance between throughput and sensitivity. Typically the optical resolution can be two to four times the pixel size.

Figure 8:
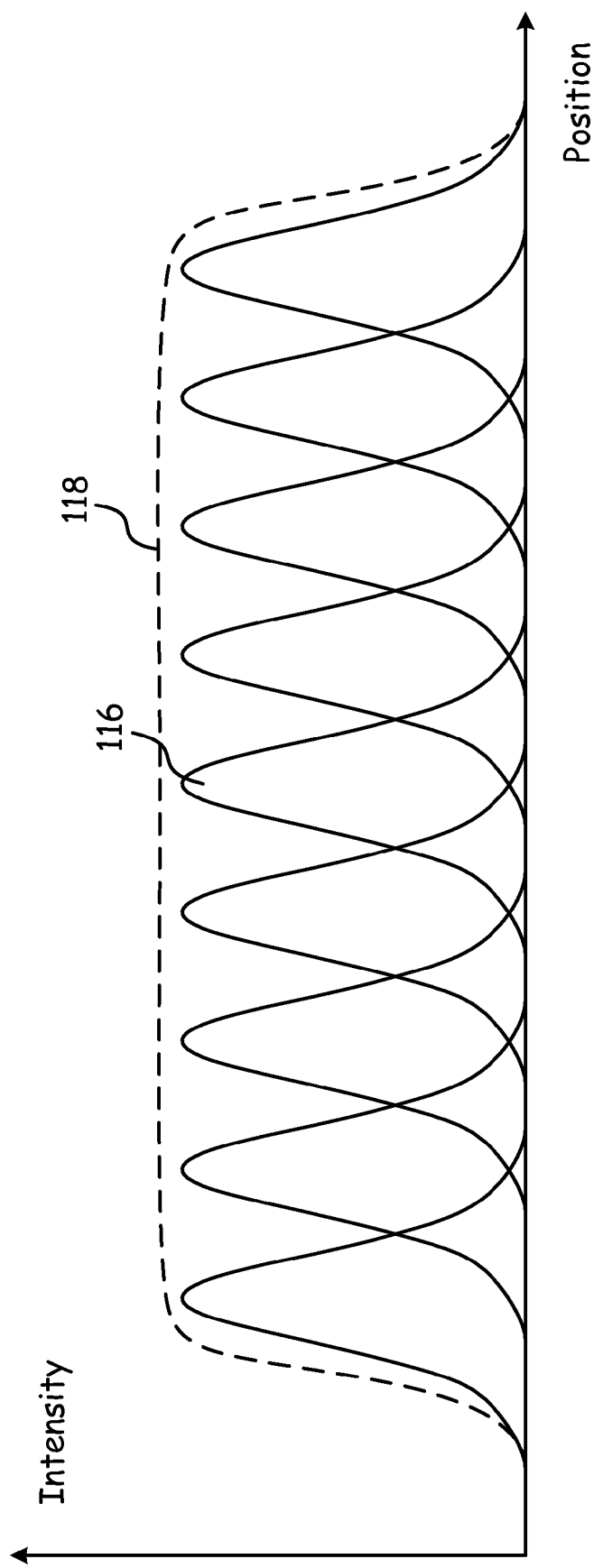
FIG. 8 is a graph of individual and overall light profiles in a light induced current system according to an embodiment of the present invention.
Figure 9:
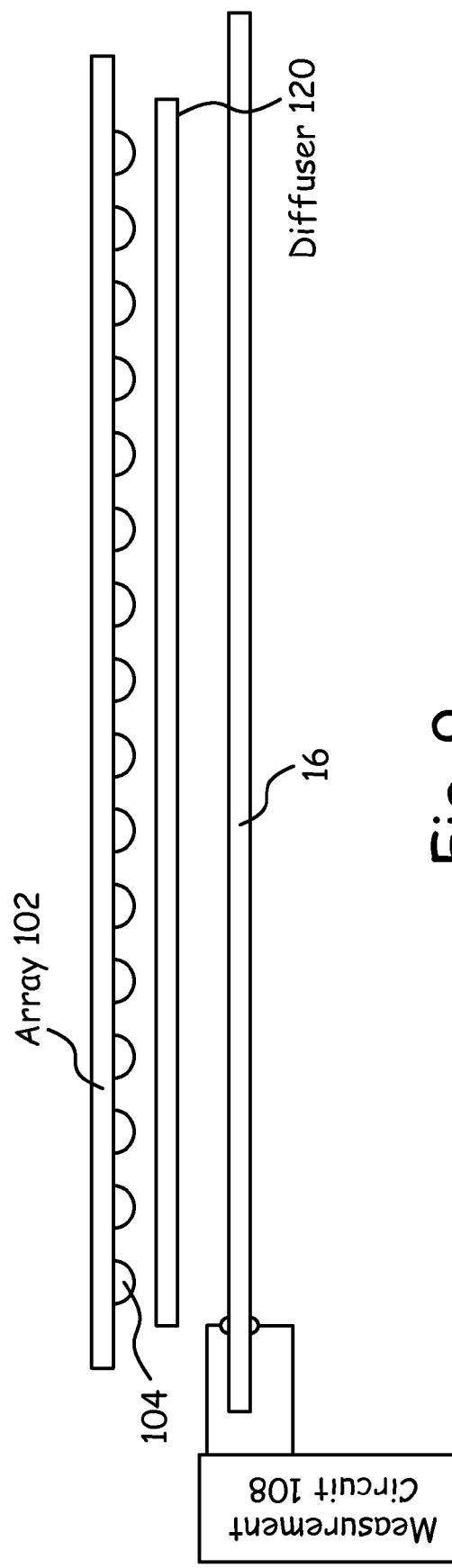
FIG. 9 is a functional block diagram of a light induced current system according to yet another embodiment of the present invention.

For current-voltage testing, it is important to generate a uniform illumination. Therefore, the spacing between diodes 104 needs to be small enough so that the overlapping illumination profiles 116 from each of the diodes 104 add together to generate a uniform illumination profile 118, as depicted in FIG. 8. Typically, if the illumination profile 116 of each diode 104 can be approximated by a Gaussian function, then the spacing between diodes 104 needs to be less than $e^{-2}$ times the width of the Gaussian profile. Alternately, a diffuser 120 can be inserted between the array 102 and the substrate 16 when a current-voltage test is taken (as depicted in FIG. 9). The diffuser 120 is then removed for a light induced current scan.

Figure 10:
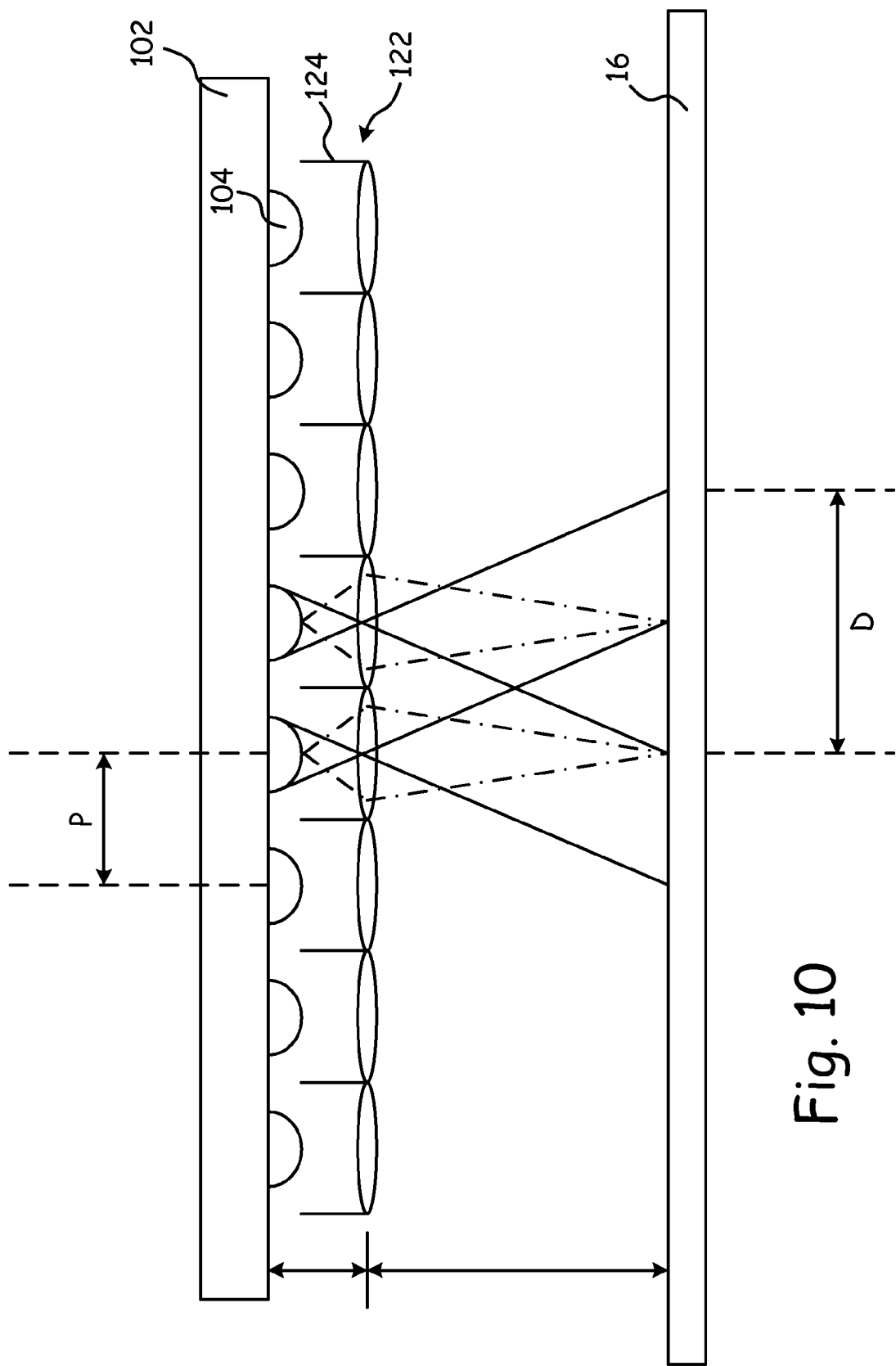
FIG. 10 is a functional block diagram of a light induced current system having lenses for the light source according to an embodiment of the present invention.
Figure 11:
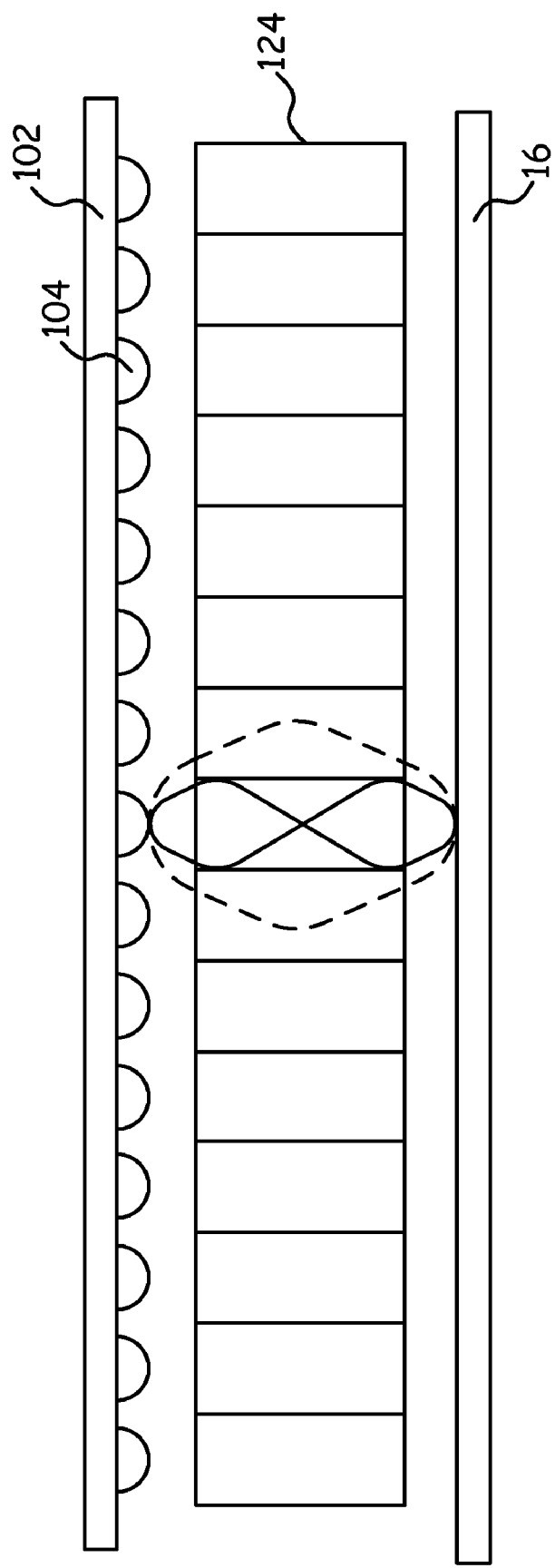
FIG. 11 is a functional block diagram of a light induced current system having gradient index lenses for the light source according to an embodiment of the present invention.

The array 102 can have a squared grid layout of the diodes 104, or other layouts of the diodes 104 that provide for a more efficient illumination of the substrate 16 when multiple wavelengths of diodes 104 are used for illumination. To have a more flexible control of optical resolution and working distance, a lens array 122 can be used to image the array 102 onto the substrate 16, as depicted in FIG. 10. A baffle tube 124 between the lens array 122 and the array 102 can block stray light, such as that from the large divergent angle of each diode 104. A gradient index lens array 124, such as with 1:1 erected imaging, can also be used to improve the optical resolution of the array 102, as depicted in FIG. 11. For a one-dimensional array 102 with a gradient index lens 124, two linear arrays 102a and 102b may be used, with an offset of one-half of a pixel (diode 104) between them, to achieve a 100% fill factor, as depicted in FIG. 4.

Figure 12:
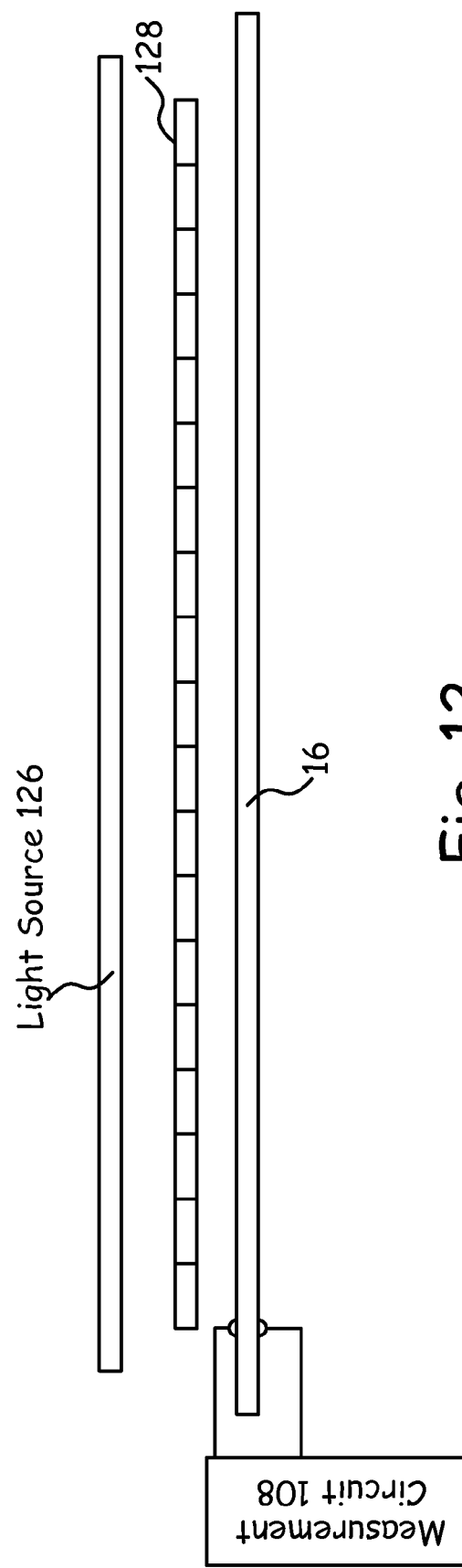
FIG. 12 is a functional block diagram of a light induced current system according to still another embodiment of the present invention.

FIG. 12 depicts an alternate embodiment that uses a diffusive light source 126 and a liquid crystal display light modulator 128. Each pixel of the modulator 128 switches the light passing through it on and off, thus producing a raster sequence of on/off switching of each pixel, and generating a light induced current image of the substrate 16.

Figure 13:
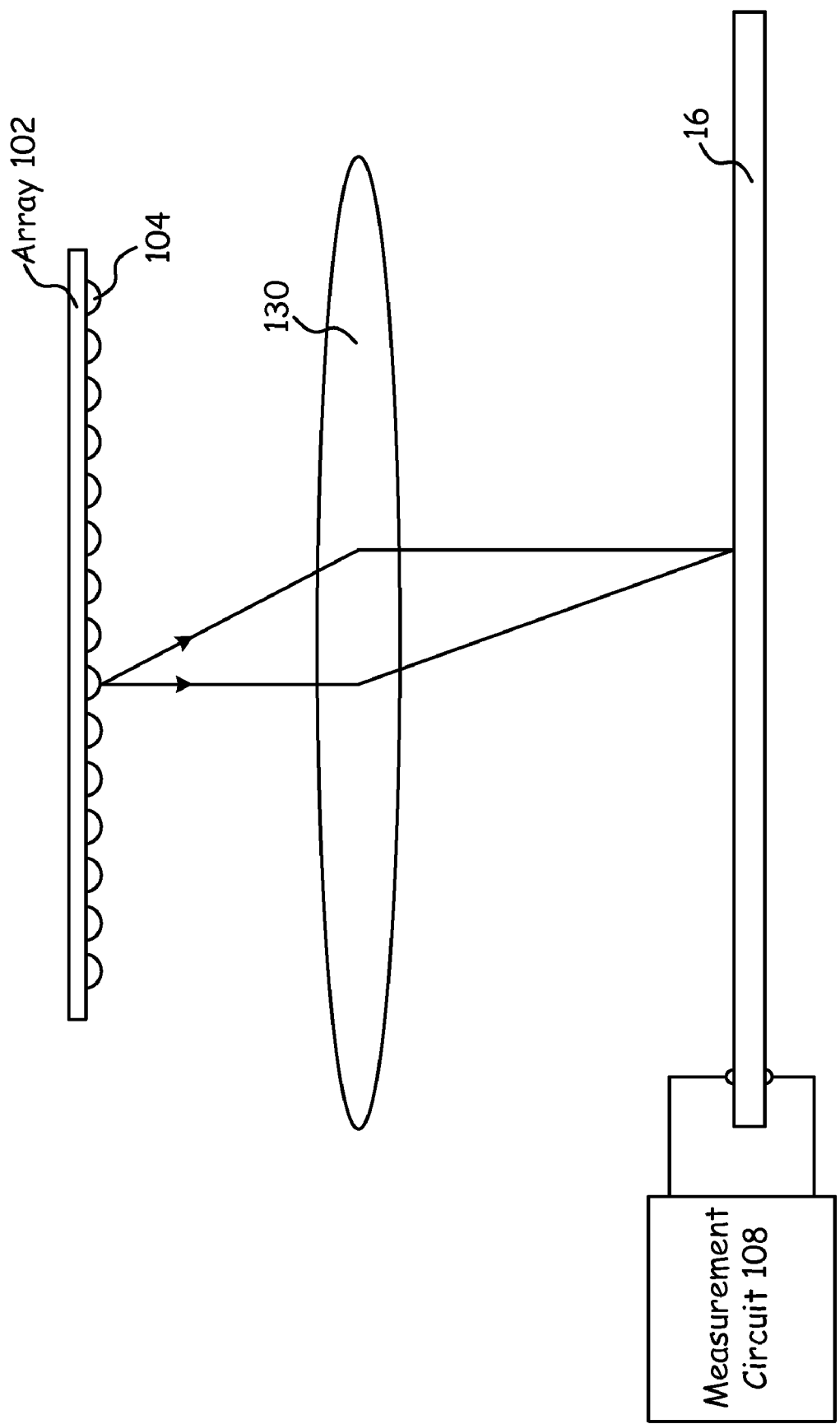
FIG. 13 is a functional block diagram of a light induced current system having a single focal lens according to an embodiment of the present invention.
Figure 14:
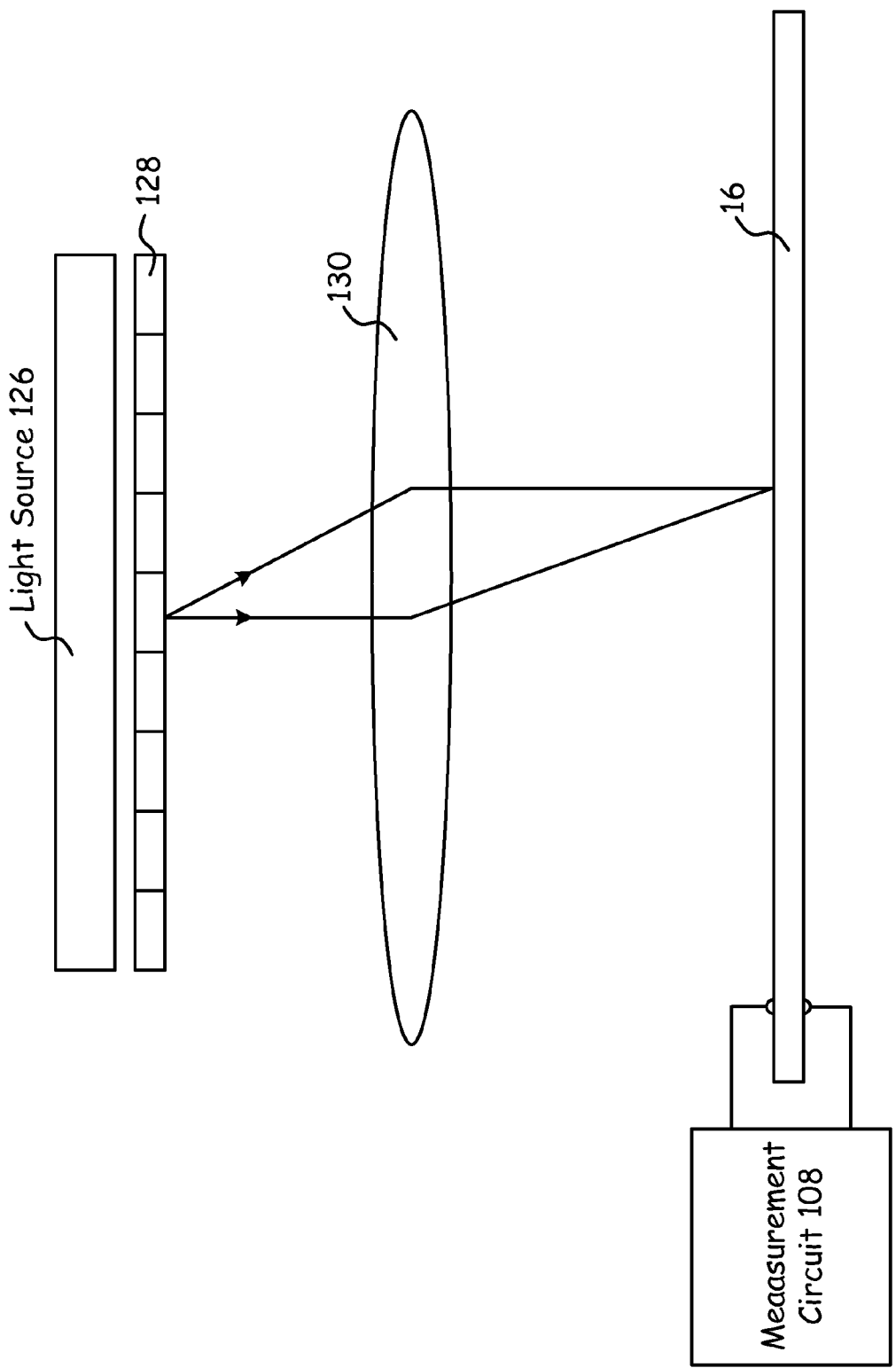
FIG. 14 is a functional block diagram of a light induced current system having a gated, diffuse light source according to an embodiment of the present invention.

In another embodiment, the array 102 can be imaged onto the substrate 16 through a lens 130, as shown in FIG. 13. This has the advantage of using a smaller array 102 that is magnified to cover a larger substrate 16. The array 102 can be a chip-scale array 102 (instead of using discrete diodes 104 that are mounted on a circuit board), which can provide better resolution. However, the total illumination power may be relatively lower than the discrete array 102 of diodes 104. The array 102 can be replaced with a diffusive light source 126 combined with a light modulator 128 such as a liquid crystal display modulator or transmission spatial light modulator, as described above and as depicted in FIG. 14.

Figure 15:
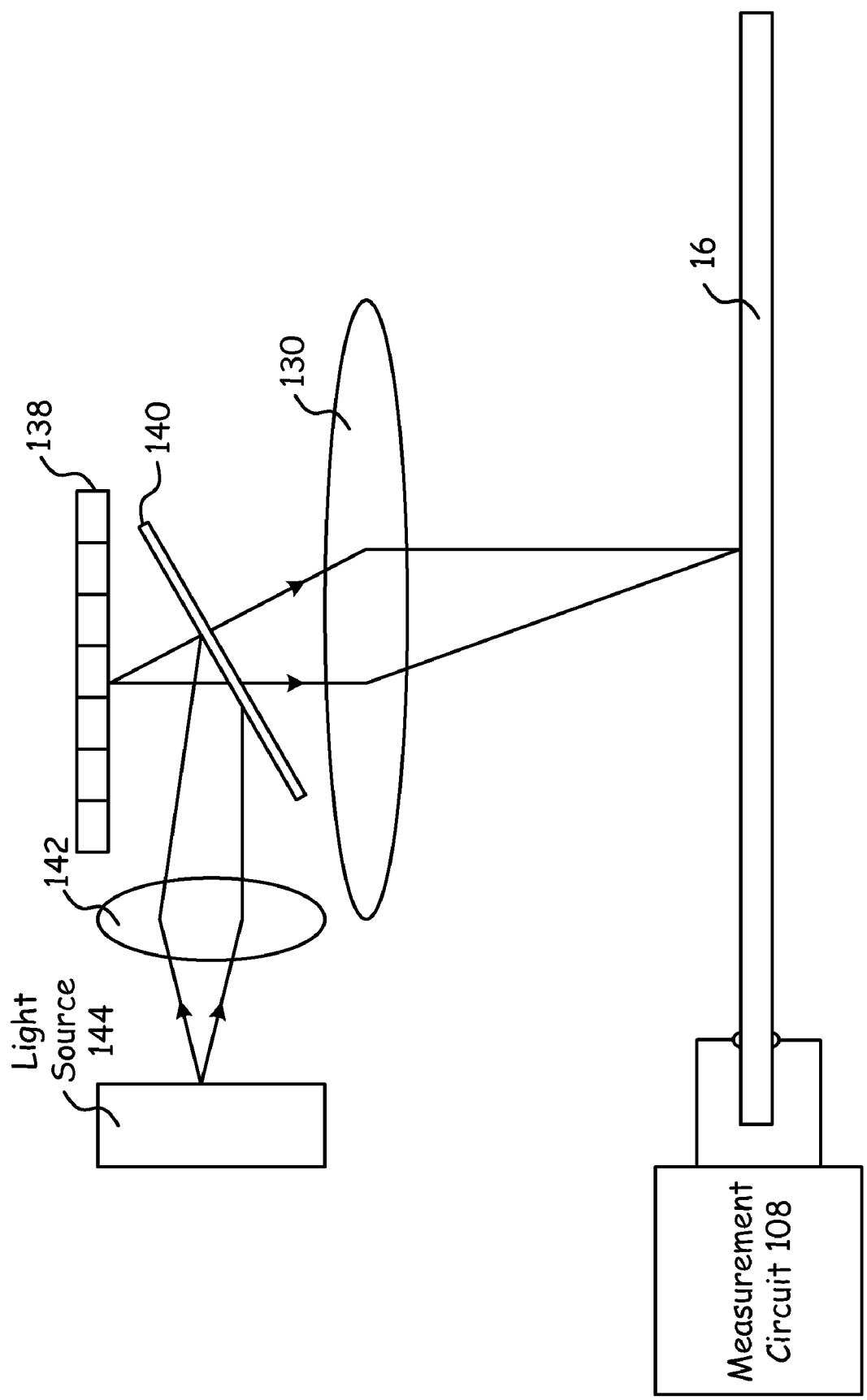
FIG. 15 is a functional block diagram of a light induced current system having a digital mirror according to an embodiment of the present invention.

FIG. 15 depicts an embodiment that uses a light source 144 that is focused onto a beam splitter 140 through a lens 142. The beam splitter 140 reflects a portion of the light onto a digital mirror 138, which is then focused by the imaging lens 130 onto the substrate 16.

Figure 16:
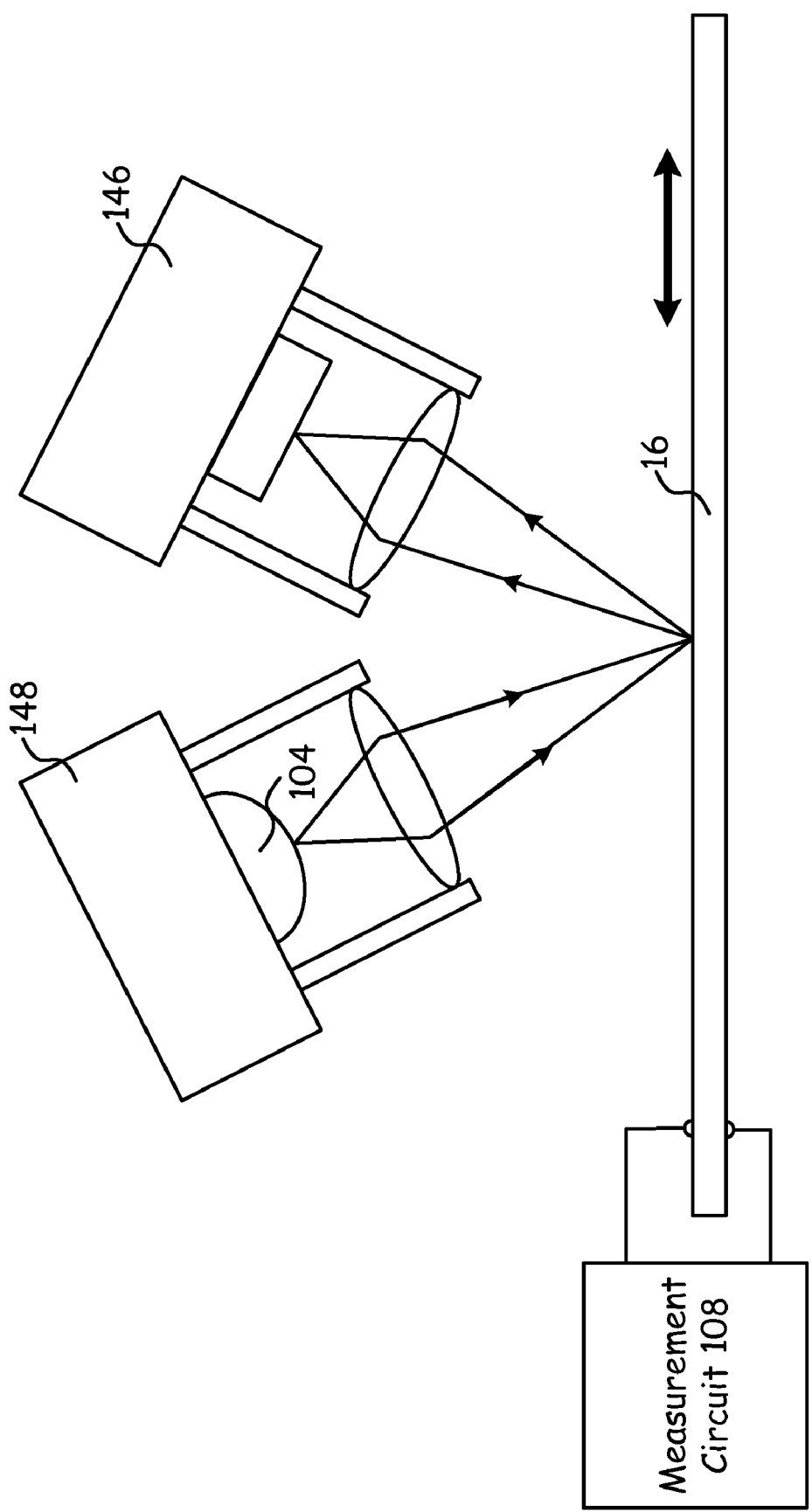
FIG. 16 is a functional block diagram of a light induced current system having a reflection monitor according to an embodiment of the present invention.

A detector array 146 can be used to measure the intensity of light that is reflected from an illumination source 148, as depicted in FIG. 16. The illumination source 148 can be a linear array of diodes 104 with individual lenses, for example. The uniformity and thickness of the anti-reflective coating can be derived from the reflectance measurement, and the absorption image can be calculated by subtracting the reflected intensity from the illumination intensity. A quantum efficiency map can also be derived from the light induced current image and the absorption image. The illumination intensity can be calibrated by using a uniform reflective surface such as a mirror in place of the substrate 16.

Figure 17:
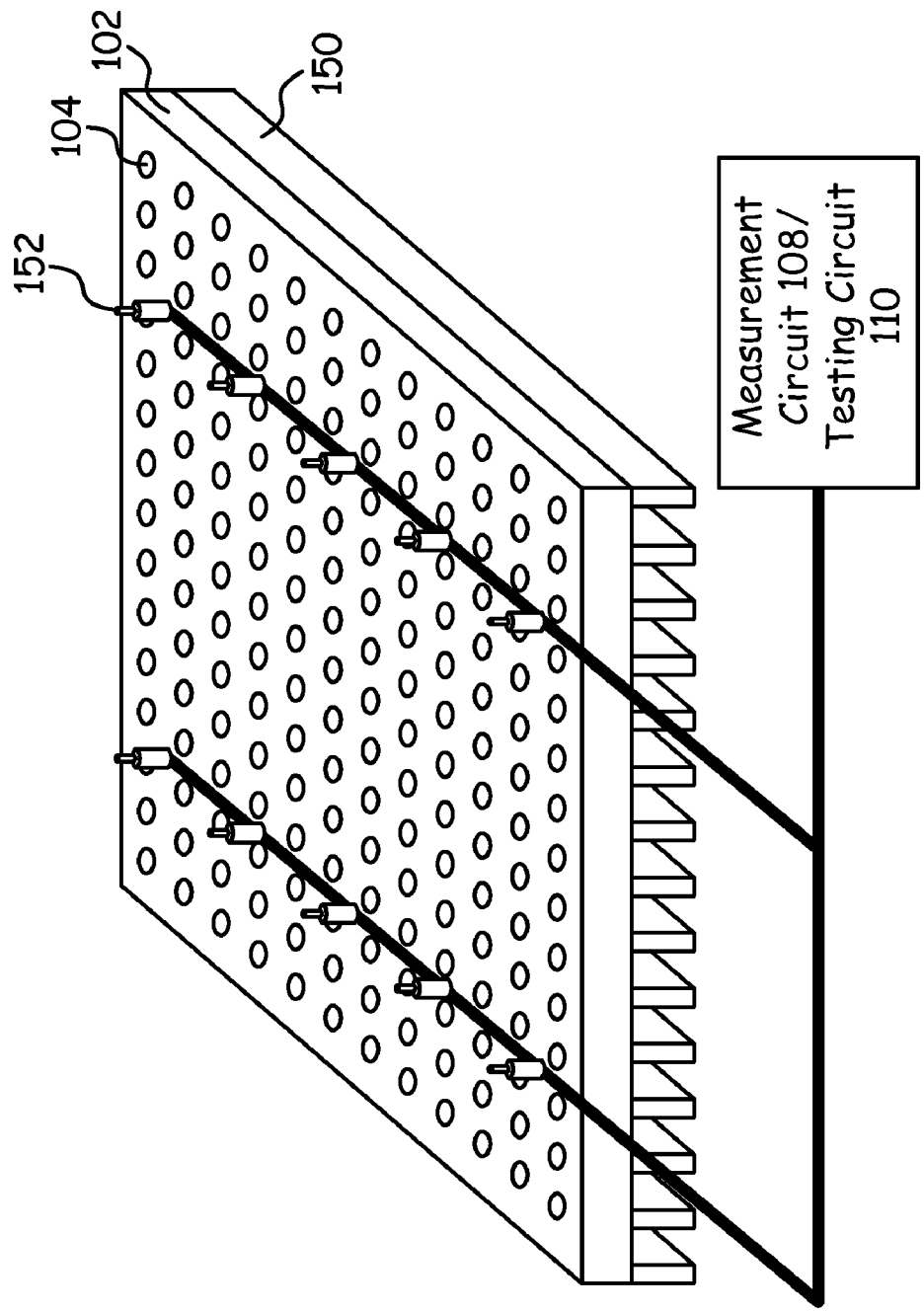
FIG. 17 is a functional block diagram of spring loaded probes on the light array of a light induced current system according to an embodiment of the present invention.

FIG. 17 depicts an array 102 with integrated electrical probes 152 for current-voltage testing. This apparatus reduces the steps required for loading and unloading substrates 16 when electrical testing is involved, since the illuminator 102 and the probes 152 can be raised as a single piece above the substrate 16 for loading/unloading operations, and then lowered for testing operations. Back side contact to the substrate 16 can be made automatically through a conductive surface on the substrate receiving surface of the system 100, such as a chuck 18, as generally depicted in various ones of the figures. Thus, electrical connections can be made to the substrate 16 without any additional steps. A heat sink 150 is preferably disposed on the back side of the array 102, so as to remove heat from the array 102.

Figure 18:
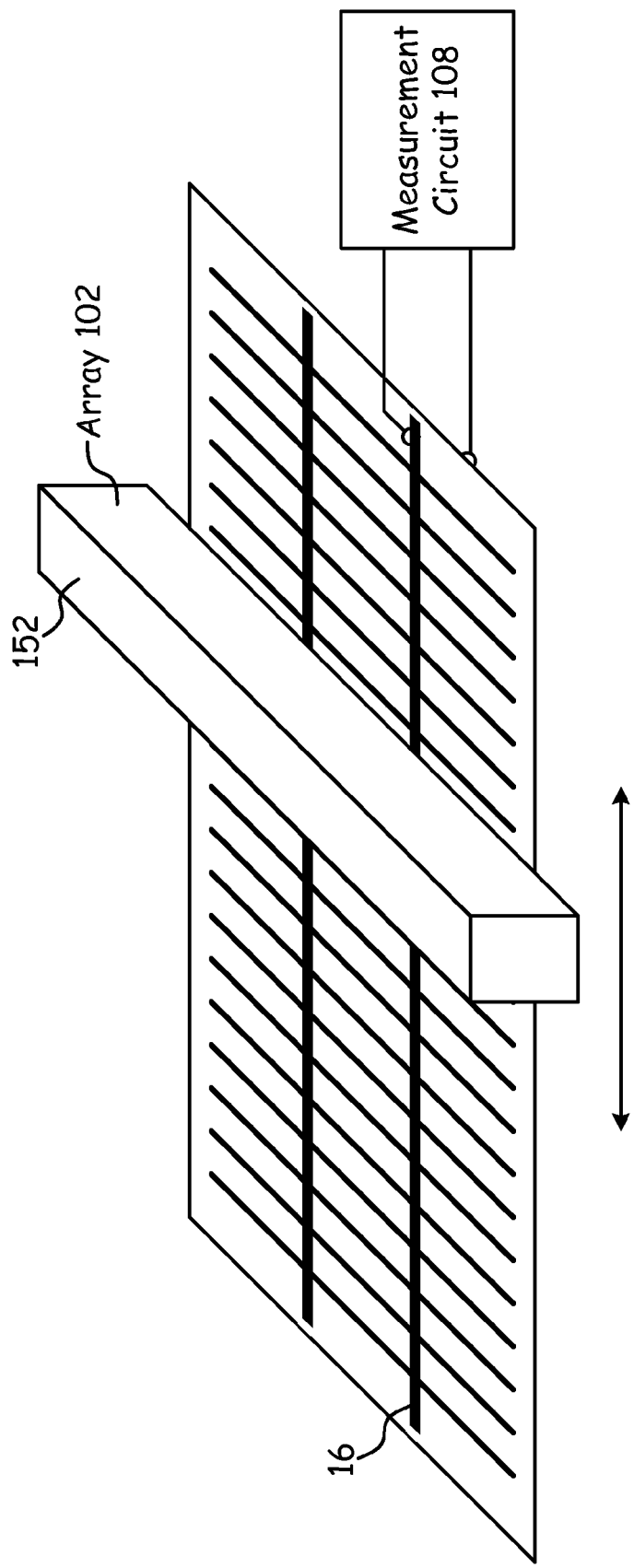
FIG. 18 is a functional block diagram of an in-process light induced current system according to an embodiment of the present invention.

FIG. 18 depicts yet another embodiment of the apparatus, in which the array 102 is disposed in a gantry 152 that can scan across the substrate 16 to acquire a two-dimensional light induced current image. One embodiment integrates the light induced current system 100 with other inspection and repair modules on a factory conveyor, and replaces a section of the conveyor with a simple linear motion mechanism that moves the solar cell 16 at a more controlled speed, and at the same time provides electrical contact for current measurements, such as generally depicted in FIG. 18. In such configurations, the typical resolution is around 0.5 mm±1 mm, and the inspection speed is around one second per solar cell 16 at a dimension of 150 mm×150 mm. Illuminated current-voltage testing can also be included in this embodiment. The embodiment of FIG. 18 can also be scaled to work with large thin film solar cells that can be larger than two meters square.

Figure 19:
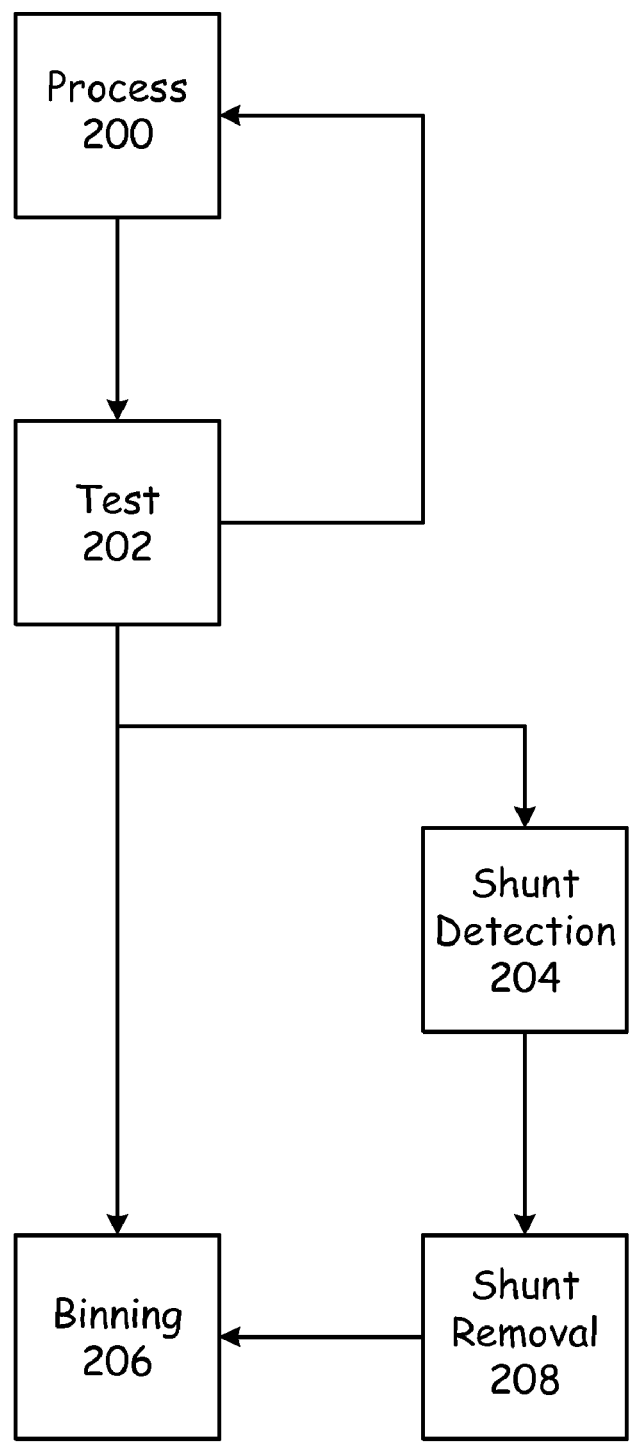
FIG. 19 is a flow chart of the use of a light induced current system according to an embodiment of the present invention.

FIG. 19 is a flow chart depicting one series of steps for using the system 100 in a solar cell 16 fabrication process. According to this embodiment of the method, the process 200 produces a solar cell substrate 16, which is tested on the apparatus 100 as described above, and given in step 202. Information from the testing process 202 is fed back to the process 200, to improve the process 200. Information from the testing on the apparatus 100, as provided in step 202, is used to determine whether the substrate 16 should be passed directly to yield/efficiency binning 206, or processed through shunt detection 204 and optional shunt removal 208.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for inducing a current in a solar cell substrate, the apparatus comprising:
    a substrate receiving surface for receiving the substrate,
    an array of a plurality of individually addressable light sources comprising pixels for illuminating the substrate in a sequenced manner, wherein the array of individually addressable light sources comprises a diffuse light source adjacent a liquid crystal display, where individual pixels of the liquid crystal display are individually addressable and operable to permit or prevent transmission of light from the diffuse light source in the sequenced manner,
    a sequencer for controlling the sequenced manner of illumination of the substrate by the array,
    a front side electrical contact for making electrical contact to a front side of the substrate,
    a back side electrical contact for making electrical contact to a back side of the substrate, and
    a meter electrically connected to the front side electrical contact and the back side electrical contact, the meter for sensing the current induced in the substrate during the sequenced illumination of the substrate.

2. The apparatus of claim 1, wherein the liquid crystal display is a two dimensional array of individually addressable pixels.

3. The apparatus of claim 1, wherein the liquid crystal display is a linear array of individually addressable pixels.

4. The apparatus of claim 1, wherein the liquid crystal display comprises two linear arrays of individually addressable pixels, where the pixels of each linear array are offset one from another.

5. The apparatus of claim 1, wherein the diffuse light sources comprises a monochromatic light source.

6. The apparatus of claim 1, wherein the diffuse light sources comprises a multi-chromatic light source.

7. The apparatus of claim 1, further comprising a lens for focusing the sequenced illumination on the substrate.

8. The apparatus of claim 1, further comprising an array of lenses for focusing the sequenced illumination on the substrate, where one each of the lenses in the array of lenses is associated with one of each of the pixels.

9. The apparatus of claim 1, further comprising a gradient index lens array disposed between the liquid crystal display and the substrate receiving surface.

10. The apparatus of claim 1, further comprising a detector for receiving reflected light from the substrate and for determining an intensity of the reflected light.

11. The apparatus of claim 1, further comprising:
    a voltage sensing meter electrically connected to the substrate,
    a current providing instrument electrically connected to the substrate, and
    means for constructing a current-voltage profile of the substrate during illumination of the substrate.

12. The apparatus of claim 1, wherein the front side electrical contacts comprise electrical probes disposed on the array of individually addressable light sources, the electrical probes for making electrical contact to the front side of the substrate as the array is brought toward the substrate receiving surface.

13. The apparatus of claim 1, wherein the array of individually addressable light sources is disposed in a gantry that is movable along a length of the substrate receiving surface.

14. The apparatus of claim 1, wherein the substrate receiving surface is disposed on a chuck that is movable underneath the array of individually addressable light sources.

15. A method for inducing a current in a solar cell substrate, the method comprising the steps of:
    placing the solar cell substrate on a substrate receiving surface,
    illuminating the solar cell substrate in a sequenced manner with an array of a plurality of individually addressable light sources,
    making electrical contact to a front side of the solar cell substrate with a front side electrical contact,
    making electrical contact to a back side of the solar cell substrate with a back side electrical contact, and
    sensing a current induced in the solar cell substrate during the sequenced illumination of the solar cell substrate with a meter that is electrically connected to the front side electrical contact and the back side electrical contact.

16. The method of claim 15, further comprising the steps of:
    sensing a substrate voltage with a voltage sensing meter that is electrically connected to the substrate,
    providing a current to the substrate with a current providing instrument that is electrically connected to the substrate, and
    constructing a current-voltage profile of the substrate during illumination of the substrate.

* * * * *